United States Patent
Kato et al.

(10) Patent No.: US 10,479,242 B2
(45) Date of Patent: Nov. 19, 2019

(54) VEHICLE SEAT

(71) Applicant: TOYOTA BOSHOKU KABUSHIKI KAISHA, Aichi-ken (JP)

(72) Inventors: Yasuhiro Kato, Aichi-ken (JP); Fumitoshi Akaike, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/934,175

(22) Filed: Mar. 23, 2018

(65) Prior Publication Data
US 2018/0281639 A1  Oct. 4, 2018

(30) Foreign Application Priority Data
Mar. 29, 2017 (JP) ................. 2017-064811

(51) Int. Cl.
*B60N 2/56* (2006.01)
*B60N 2/68* (2006.01)

(52) U.S. Cl.
CPC ............. *B60N 2/5635* (2013.01); *B60N 2/68* (2013.01); *B60N 2/682* (2013.01)

(58) Field of Classification Search
CPC ........ B60N 2/5635; B60N 2/68; B60N 2/682; B60N 2/58; B60N 2/5621; B60N 2/5657; B60N 2/643; B60N 2/986
USPC .................................................. 297/180.14
See application file for complete search history.

(56) References Cited

U.S. PATENT DOCUMENTS

| | | | | |
|---|---|---|---|---|
| 5,102,189 A | * | 4/1992 | Saito ................... | B60N 2/5635 297/180.14 X |
| 6,644,735 B2 | * | 11/2003 | Bargheer ............ | B60H 1/00285 297/180.14 X |
| 6,746,076 B2 | * | 6/2004 | Bogisch ................... | B60J 7/223 297/180.14 |
| 7,673,935 B2 | * | 3/2010 | Nishide ................ | B60N 2/5635 297/180.14 |
| 8,646,836 B2 | * | 2/2014 | Oota .................... | B60N 2/5657 297/180.14 X |
| 2002/0057005 A1 | * | 5/2002 | Bargheer ................. | B60J 7/223 297/180.13 |
| 2002/0057006 A1 | * | 5/2002 | Bargheer ........... | B60H 1/00285 297/180.14 |
| 2006/0267383 A1 | * | 11/2006 | Bargheer ............. | B60N 2/5635 297/180.14 |
| 2007/0107440 A1 | * | 5/2007 | Ito ........................ | B60N 2/5635 62/3.2 |
| 2008/0129090 A1 | * | 6/2008 | Zeyen .................. | B60N 2/5635 297/180.14 |
| 2008/0136221 A1 | * | 6/2008 | Hartmann .......... | B60H 1/00821 297/180.14 |

(Continued)

FOREIGN PATENT DOCUMENTS

JP 2003-250660 9/2003
JP 2010142274 A * 7/2010 ........... B60N 2/5635

*Primary Examiner* — Rodney B White
(74) *Attorney, Agent, or Firm* — Greenblum & Bernstein, P.L.C.

(57) ABSTRACT

A vehicle seat including: a seat frame extending in a first direction; and an air conditioning duct extending in a second direction intersecting the first direction, wherein the duct intersects the seat frame, and wherein the duct is inserted into a through hole which is formed in the seat frame and penetrates the seat frame in the second direction.

8 Claims, 6 Drawing Sheets

(56) References Cited

U.S. PATENT DOCUMENTS

| | | | | |
|---|---|---|---|---|
| 2008/0191520 A1* | 8/2008 | Hartmann | ............ | B60N 2/5635 |
| | | | | 297/180.12 |
| 2008/0203781 A1* | 8/2008 | Bargheer | ............... | B60N 2/879 |
| | | | | 297/180.13 |
| 2008/0290703 A1* | 11/2008 | Bargheer | ............. | B60N 2/5621 |
| | | | | 297/180.14 |
| 2008/0315634 A1* | 12/2008 | Hartmann | ............ | B60N 2/5635 |
| | | | | 297/180.14 |
| 2009/0008970 A1* | 1/2009 | Flory | ................... | B60N 2/5621 |
| | | | | 297/180.14 |
| 2009/0134677 A1* | 5/2009 | Maly | .................... | B60N 2/5635 |
| | | | | 297/180.14 |
| 2011/0133525 A1* | 6/2011 | Oota | .................... | B60N 2/5635 |
| | | | | 297/180.14 |
| 2012/0256450 A1* | 10/2012 | Sahashi | ................ | B60N 2/5635 |
| | | | | 297/180.14 |
| 2014/0179212 A1* | 6/2014 | Space | .................... | B60N 2/565 |
| | | | | 454/76 |

* cited by examiner

VEHICLE SEAT

CROSS-REFERENCE TO RELATED APPLICATIONS

This application claims priority from Japanese Patent Application No. 2017-064811 filed on Mar. 29, 2017, the entire contents of which are incorporated herein by reference.

TECHNICAL FIELD

The disclosure relates to a vehicle seat, specifically to a vehicle seat including a seat frame extending in a first direction and an air conditioning duct extending in a second direction intersecting the first direction.

BACKGROUND

In a vehicle seat, there has been known a configuration in which a seat frame is formed by a hollow pipe and an air conditioning duct is connected to the hollow pipe (see JP-A-2003-250660).

However, in the related art, disposing space and length of the duct increases and a configuration thereof enlarges in a case where the air conditioning duct is disposed not to connect with the seat frame and to take a detour.

SUMMARY

The disclosure is made to solve the above problem, and a problem to be solved by the disclosure is to dispose an air conditioning duct compactly in a vehicle seat.

According to an aspect of the disclosure, there is provided a vehicle seat including: a seat frame extending in a first direction; and an air conditioning duct extending in a second direction intersecting the first direction, wherein the duct intersects the seat frame, and wherein the duct is inserted into a through hole which is formed in the seat frame and penetrates the seat frame in the second direction.

According to another aspect of the disclosure, there is provided a vehicle seat including: a seat frame extending in a first direction; and an air conditioning duct extending in a second direction intersecting the first direction, wherein the duct intersects the seat frame, wherein the seat frame has a through hole which penetrates the seat frame in the second direction, wherein a flange portion protruding in a tubular shape in the second direction is provided to the seat frame, wherein the flange portion defines a hole which is a part of the through hole, and wherein the duct is fitted to the flange portion.

DETAILED DESCRIPTION

Hereinafter, modes for carrying out the disclosure will be described with reference to the drawings.

First Embodiment

Schematic Configuration of Seat 1

First, a configuration of a seat 1 (vehicle seat) according to a first embodiment will be described with FIGS. 1 to 6. Incidentally, in the following description, directions showing such as front, rear, upper, lower, left, and right directions refer to respective directions shown in the drawings. Also, a "seat width direction" refers to a left-right direction of the seat 1, a "seat height direction" refers to an upper-lower direction of the seat 1, and a "seat front-rear direction" refers to a front-rear direction of the seat 1.

Figure 1:
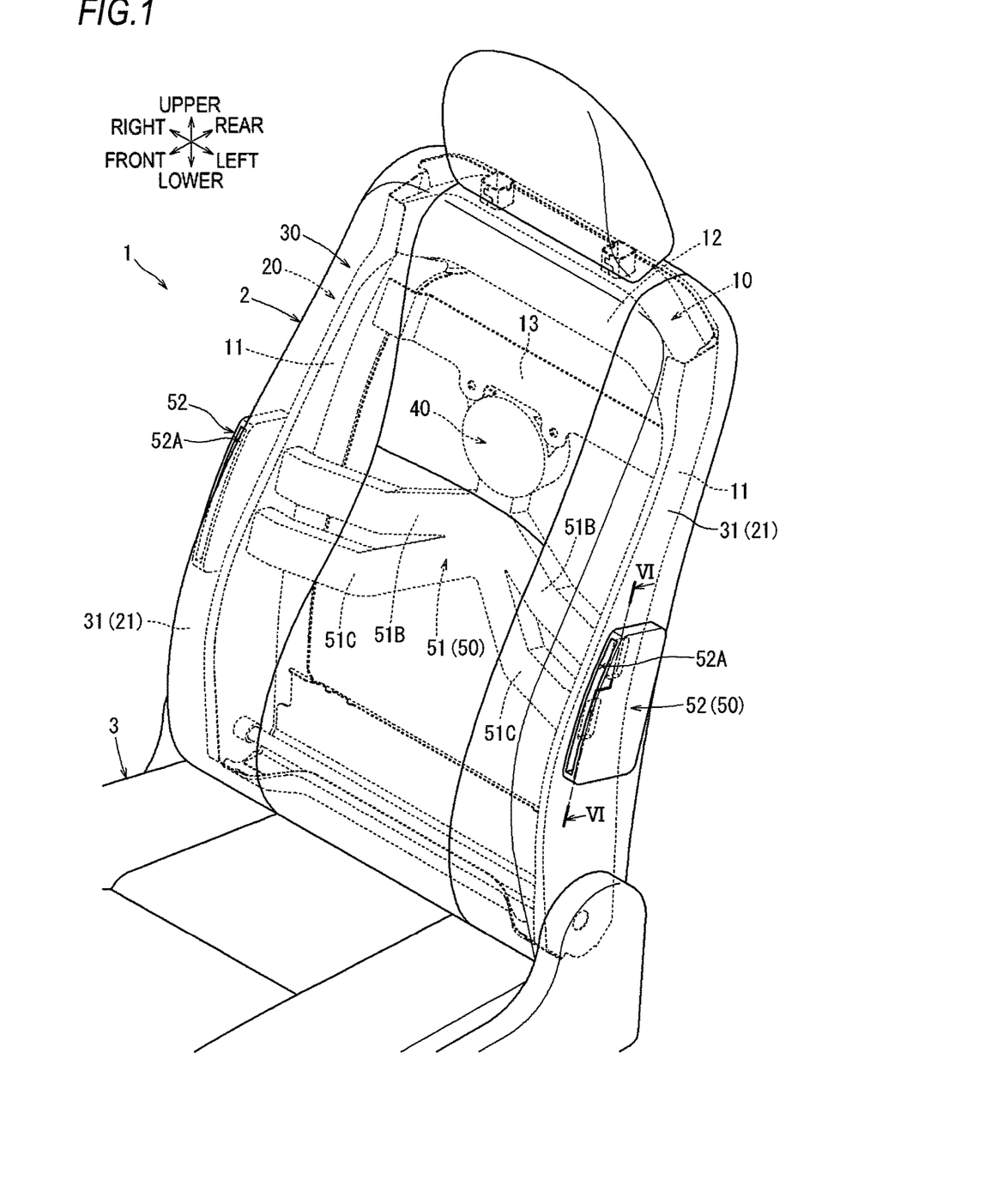
FIG. 1 is a perspective view showing a schematic configuration of a vehicle seat according to a first embodiment.

As shown in FIG. 1, the seat 1 according to the embodiment is configured as a right seat of an automobile, and includes a seat back 2 forming a backrest portion of a seated person and a seat cushion 3 forming a seating portion thereof. Lower end portions on left and right sides of the seat back 2 are coupled to rear end portions on left and right sides of the seat cushion 3 separately via a recliner (not shown) in a state where a backrest angle can be adjusted. The seat cushion 3 is coupled to a floor of a vehicle via a pair of left and right slide rails (not shown) therebetween in a state where a position thereof in the seat front-rear direction can be adjusted.

On left and right side portions of the seat back 2, air conditioning ducts 50 through which air can be blown towards a body of the seated person are provided in a state where air outlets 52A are exposed to outer sides thereof. The ducts 50 are connected with an air conditioning apparatus 40 provided in the seat back 2, and are configured such that air sent out from the air conditioning apparatus 40 can be blown towards a front side of the body of the seated person from the air outlets 52A thereof.

Figure 2:
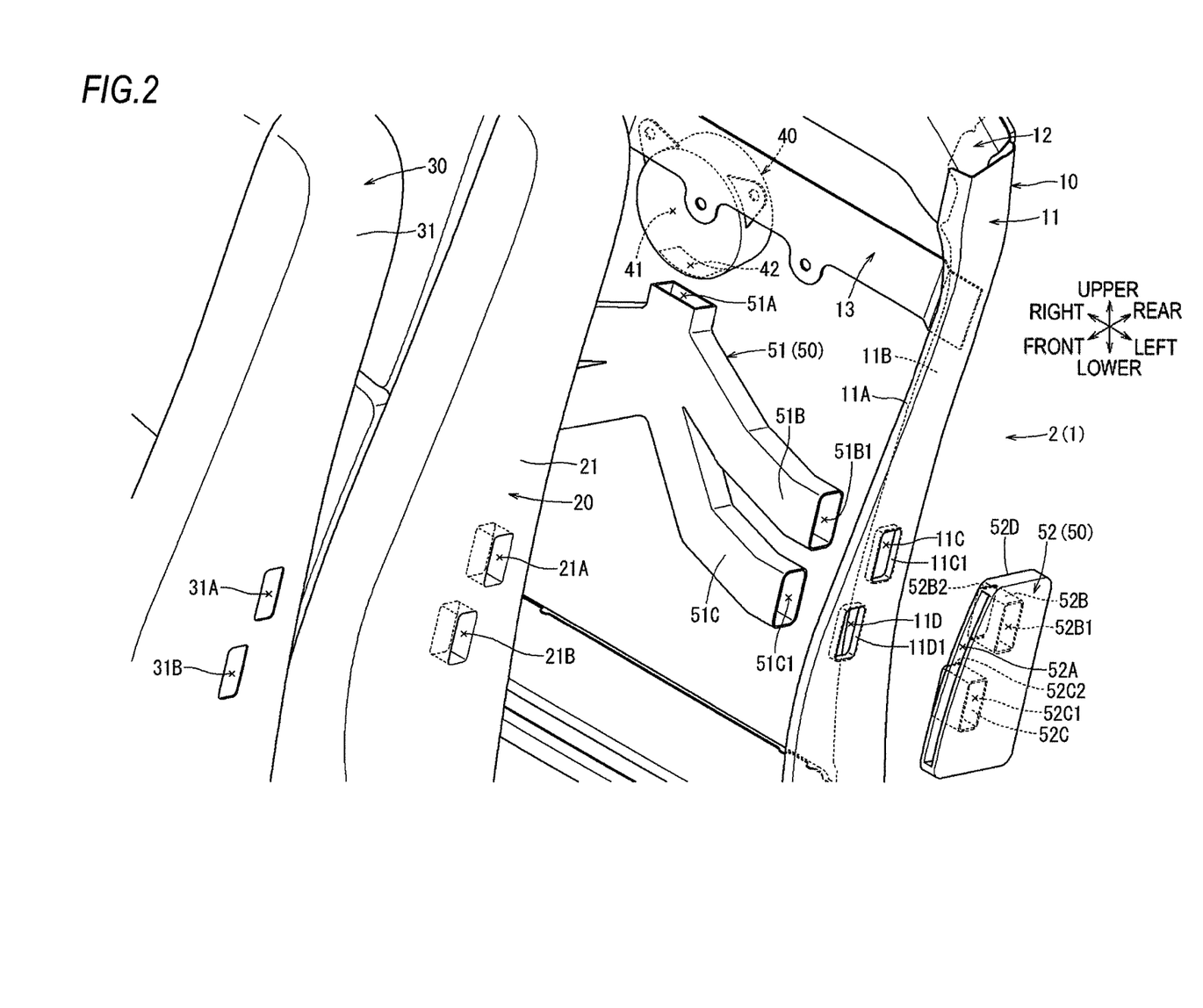
FIG. 2 is an exploded perspective view showing a state where a duct is taken off from a seat frame.

Specifically, as shown in FIG. 2, the ducts 50 are divided into a first divided duct 51 provided to connect with the air conditioning apparatus 40 in the seat back 2, and a pair of left and right second divided ducts 52 separately inserted to connect laterally and bifurcately branched flow passages of the first divided duct 51 from both the left and right outer sides of the seat back 2. Configurations of the second divided ducts 52 and connection structures thereof with respect to the first divided duct 51 are laterally symmetrical with each other.

As shown in FIG. 1, the first divided duct 51 is connected with the air conditioning apparatus 40 at a substantially central place in the seat back 2 in the seat width direction. A flow passage from the first divided duct 51 is branched laterally and bifurcately, and each of the branched flow passages has a shape branched vertically and bifurcately into a first branch flow passage 51B and a second branch flow passage 51C.

Vertically and bifurcately branched first branch flow passages 51B and second branch flow passages 51C of the first divided duct 51 are inserted respectively into corresponding flange portions 11C1 protruding along peripheries of first through holes 11C and flange portions 11D1 protruding along peripheries of second through holes 11D from inner sides thereof in the seat width direction, so as to fit into outer peripheral portions of the flange portions 11C1 and the flange portions 11D1. Here, the first through holes 11C and the second through holes 11D are formed in side frames 11 forming side frameworks on the left and right sides of the seat back 2. In this way, the first divided duct 51 is installed in a state of being in flow passage connection with the first through holes 11C and the second through holes 11D. Here, the side frames 11 correspond to "seat frame" of the disclosure, and each of the first through holes 11C and the second through holes 11D formed in the side frames 11 correspond to "through hole" of the disclosure.

Figure 4:
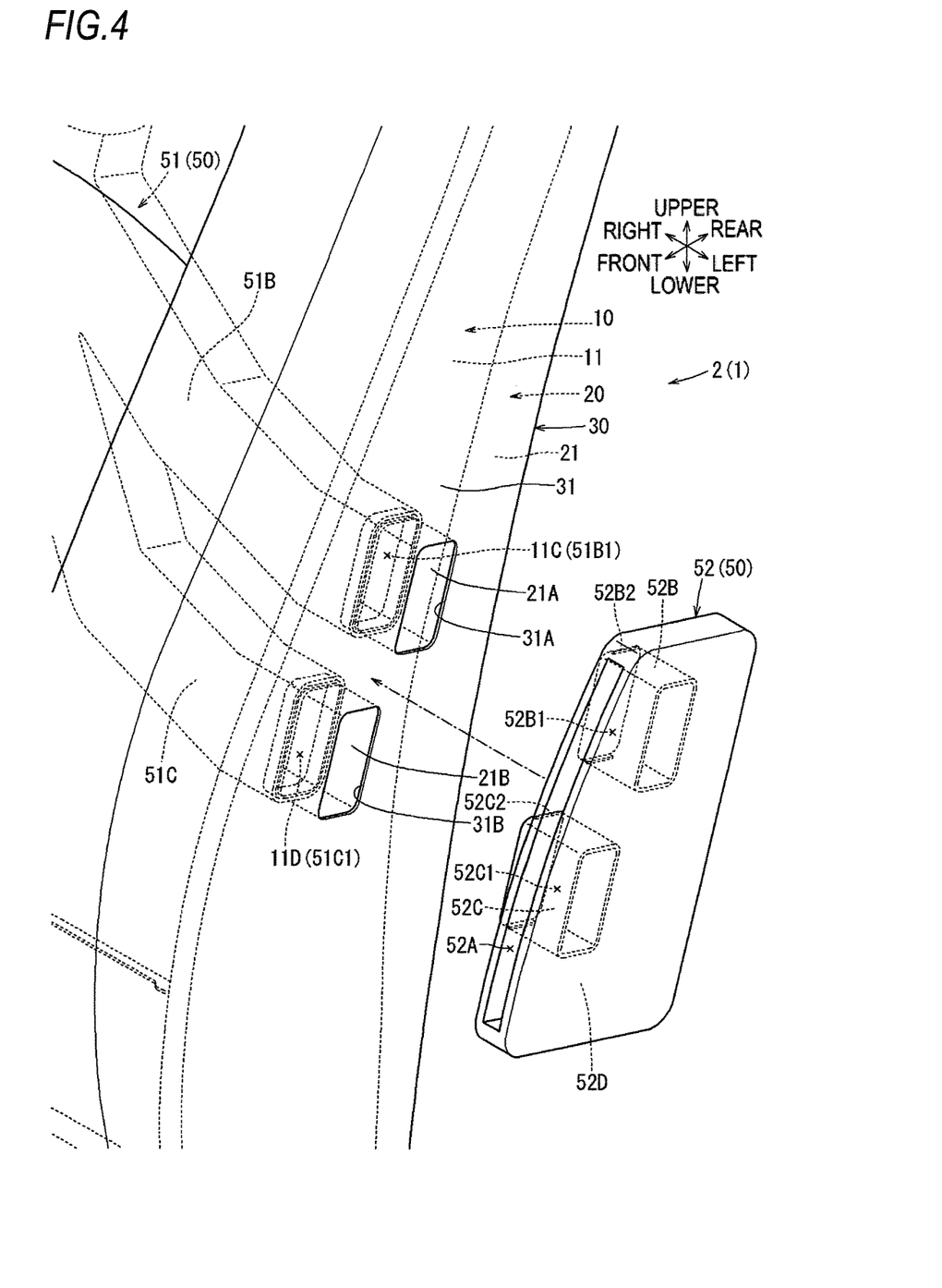
FIG. 4 is an exploded perspective view showing a state before a second divided duct is inserted into a seat back.

Meanwhile, as shown in FIG. 1, each of the second divided ducts 52 includes a longitudinally opened air outlet 52A exposed to an outer side of the seat back 2 through which air sent from the seat back 2 can be blown forward. As shown in FIG. 4, each of inner flow passages of the second divided ducts 52 communicating with the air outlets 52A has a shape branched vertically and bifurcately into a first branch flow passage 52B and a second branch flow passage 52C.

Figure 5:
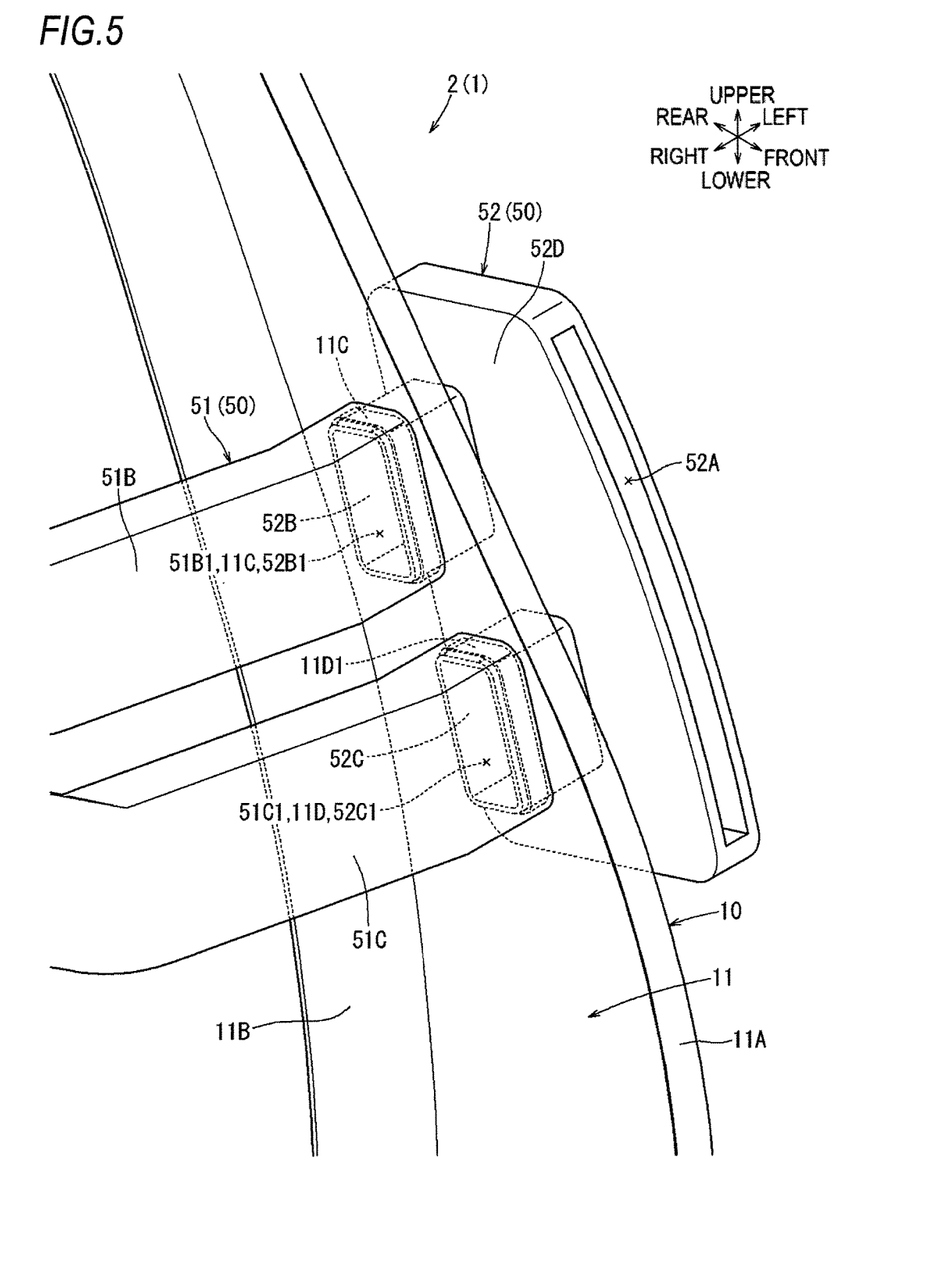
FIG. 5 is a perspective view showing a state where the second divided duct is installed on the seat frame.
Figure 6:
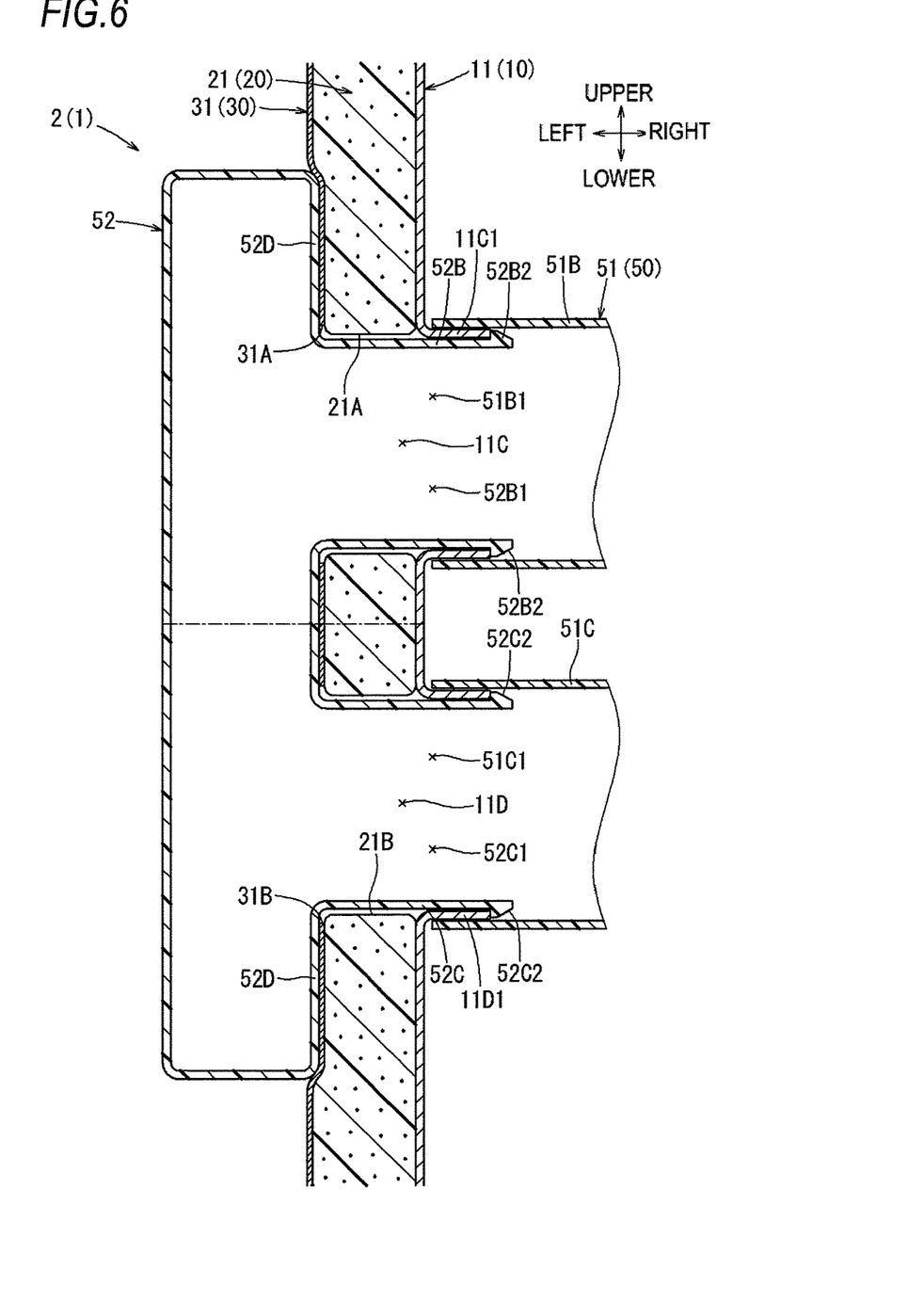
FIG. 6 is sectional view taken along a line VI-VI in FIG. 1.

Vertically and bifurcately branched first branch flow passages 52B and second branch flow passages 52C of the second divided ducts 52 are inserted respectively into corresponding first insertion holes 31A, 21A and second insertion holes 31B, 21B formed so as to penetrate both the left and right side portions of the seat back 2 from outer sides thereof in the seat width direction. In this way, as shown in FIGS. 5 to 6, the second divided ducts 52 are installed integrally to the side frames 11 in a state of being inserted into the corresponding first through holes 11C and the second through holes 11D and of being in flow passage connection therewith. Here, the first through holes 11C and the second through holes 11D are formed in the side frames 11 and are positioned on inner sides of the first insertion holes 31A, 21A and the second insertion holes 31B, 21B in the seat width direction.

Since the second divided ducts 52 are installed by inserting into the seat back 2, the first branch flow passages 52B and the second branch flow passages 52C of the second divided ducts 52 are installed in a state of being in flow passage connection respectively with the corresponding first branch flow passages 51B and the second branch flow passages 51C on left and right of the first divided duct 51 via the corresponding first through holes 11C and the second through holes 11D of the side frames 11 to which the first branch flow passages 52B and the second branch flow passages 52C are inserted.

With the above installment, each of the first divided duct 51 and the second divided ducts 52 achieve a state of being installed integrally to the side frames 11 at two places different in the seat height direction, and are provided in a state of having high structural strength capable of receiving and widely dispersing loads received from outside.

Specific Configuration of Seat Back 2

Hereinafter, a specific configuration of portions of the seat back 2 will be described in detail. A basic configuration of the seat back 2 will be described first.

As shown in FIG. 2, the seat back 2 is schematically configured by a metal back frame 10 forming a framework thereof, a foamed urethane back pad 20 set to a front portion of the back frame 10 and elastically receiving a backrest load of the seated person, and a fabric back cover 30 covering an entire surface of the back pad 20 and forming a design surface of the seat back 2. The back frame 10 is installed with the air conditioning apparatus 40 (air blower) for blowing air for air conditioning, and the resin ducts 50 including the air outlets 52A through which air discharged from the air conditioning apparatus 40 can be guided to the left and right side portions of the seat back 2 and be blown to front sides thereof from the left and right side portions of the seat back 2.

Configuration of Back Frame 10

The back frame 10 is assembled into a form including a pair of left and right longitudinal side frames 11 forming the side frameworks on the left and right sides of the seat back 2, an upper pipe 12 which is formed of a round pipe material bent into an inverted U shape and is integrally bridged between upper portions of the side frames 11 to form an upper framework of the seat back 2, and a flat bridging panel 13 integrally bridged between the upper portions of the side frames 11.

Each of the side frames 11 is formed into a form of an erected plate whose surface straightly faces the seat width direction and which extends elongatedly in the seat height direction. On the side frames 11, front side flanges 11A bending and protruding to inner sides thereof in the seat width direction are formed along edge portions on front sides of the side frames 11. Also, on edge portions on rear sides of the side frame 11, rear side flanges 11B bending and protruding to the inner sides thereof in the seat width direction are formed along the same edge portions.

Furthermore, in intermediate portions of the side frames 11 in the seat height direction, the longitudinal first through holes 11C and the second through holes 11D passing through the side frames 11 in the seat width direction (plate thickness direction) are formed in places separated from each other in the seat height direction and the seat front-rear direction. The first through holes 11C and the second through holes 11D have an arrangement relationship that arrangements thereof in the seat height direction and the seat front-rear direction are separated obliquely from each other without overlapping. In peripheries of the first through holes 11C and the second through holes 11D, the flange portions 11C1, 11D1 protruding into a tubular shape to the inner sides thereof in the seat width direction are formed respectively around these holes by burring processing.

Configuration of Back Pad 20

The back pad 20 is set to a state of covering the back frame 10 from a front side thereof. Specifically, the back pad 20 is set to a form covering the side frames 11 and the upper pipe 12 forming the back frame 10 from the front side thereof, such that the back pad 20 is provided in a state of being supported strongly via the side frames 11 and the upper pipe 12 from a rear side thereof. Also, the back pad 20 achieves a state of being supported via the back frame 10 from the rear side thereof in a substantially planar shape across a wide range, since a central region of the back pad 20 which is not supported by the side frames 11 or the upper pipe 12 of the back frame 10 is also supported from the rear side thereof by a contour mat (not shown) bridged over the back frame 10.

After being set to the front portion of the back frame 10, the back pad 20 achieves a state of being fixed in position by being pressed to the back frame 10 via the back cover 30 covering the entire surface thereof. Specifically, after the back pad 20 is set to the front portion of the back frame 10, upper, lower, left and right peripheral edge portions of the back cover 30 covering the entire surface of the back pad 20 are separately drawn to a rear side of the back frame 10 to be fixed thereto. In this way, the back pad 20 is kept in a state of being pressed to the back frame 10 from the front side and both the left and right sides thereof via the back cover 30.

In peripheral side portions 21 of the back pad 20 which cover both outer sides of the side frames 11, the longitudinal first insertion holes 21A and second insertion holes 21B passing through thereof in the seat width direction (plate thickness direction) are formed in places separated from each other in the seat height direction and the seat front-rear direction. The first insertion holes 21A and the second insertion holes 21B are formed by penetrating the peripheral side portions 21 along the first through holes 11C and the second through holes 11D, so as to expose the first through holes 11C and the second through holes 11D formed in the side frames 11 to the outer sides thereof in the seat width direction.

Back Cover 30

After the back cover 30 is covered on the back pad 20 from a front side thereof, the upper, lower, left, and right peripheral edge portions of the back cover 30 are drawn to the rear side of the back pad 20 across an outer peripheral edge thereof, so as to be fixed to the back frame 10. With the above drawing, the back cover 30 achieves a state of being stretched into a form of being in close and wide contact with the entire surface of the back pad 20.

In left and right peripheral side surface portions 31 of the back cover 30 which cover the left and right peripheral side portions 21 of the back pad 20, the longitudinal first insertion holes 31A and the second insertion holes 31B passing through thereof in the seat width direction (plate thickness direction) are formed in places separated from each other in the seat height direction and the seat front-rear direction. The first insertion holes 31A and the second insertion holes 31B are formed by penetrating the peripheral side surface portions 31 along the first insertion holes 21A and the second insertion holes 21B, so as to expose the first insertion holes 21A and the second insertion holes 21B formed by passing through the peripheral side portions 21 of the back pad 20 respectively to the outer sides thereof in the seat width direction.

As mentioned above, since the first insertion holes 31A and the second insertion holes 31B are formed in the peripheral side surface portions 31 of the back cover 30, the corresponding first insertion holes 21A and the second insertion holes 21B formed in the peripheral side portions 21 of the back pad 20 are exposed to the outer sides thereof in the seat width direction, and meanwhile, the corresponding first through holes 11C and the second through holes 11D formed in the side frames 11 and positioned in front of these holes also achieve a state of being exposed separately to the outer sides thereof in the seat width direction (see FIG. 4).

Air Conditioning Apparatus 40 and Ducts 50

As shown in FIG. 2, the air conditioning apparatus 40 is fixed by being assembled to the bridging panel 13 of the back frame 10 from a rear side thereof. The air conditioning apparatus 40 sends air sucked from a suction port 41 opened in a rear side thereof out from an exhaust port 42 opened at a lower side thereof via rotation of an air blowing fan inside the air conditioning apparatus 40. As also mentioned above, the ducts 50 are divided into the first divided duct 51 which is provided in the seat back 2 and is connected to the air conditioning apparatus 40 and the second divided ducts 52, each of which being inserted into the laterally branched flow passages of the first divided duct 51 from both the left and right outer sides of the seat back 2.

Specifically, the first divided duct 51 includes a connection port 51A fitted into the exhaust port 42 of the air conditioning apparatus 40 from the lower side thereof to be in flow passage connection therewith, and the flow passage thereof in front of the connection port 51A has a laterally and bifurcately branched shape. Each of the laterally and bifurcately branched flow passages of the first divided duct 51 has a shape branched vertically and bifurcately into the first branch flow passage 51B and the second branch flow passage 51C.

Connection ports 51B1, 51C1 forming openings on downstream sides of the first branch flow passages 51B and the second branch flow passages 51C are fitted to the corresponding outer peripheral portions of the flange portions 11C1 of the first through holes 11C and the outer peripheral portions of the flange portions 11D1 of the second through holes 11D from the inner sides thereof in the seat width direction. The first through holes 11C and the second through holes 11D are formed in the side frames 11. In this way, the first branch flow passages 51B and the second branch flow passages 51C are formed to include an opening which is capable of being pressed and fit to the flange portions 11C1 and the flange portions 11D1 substantially without space therebetween.

The first divided duct 51 with the above configuration is installed in a form of being stretched between the exhaust port 42 of the air conditioning apparatus 40 and the side frames 11. First, the connection port 51A of the first divided duct 51 is fitted into the exhaust port 42 of the air conditioning apparatus 40 from the lower side thereof to be in flow passage connection therewith.

Figure 3:
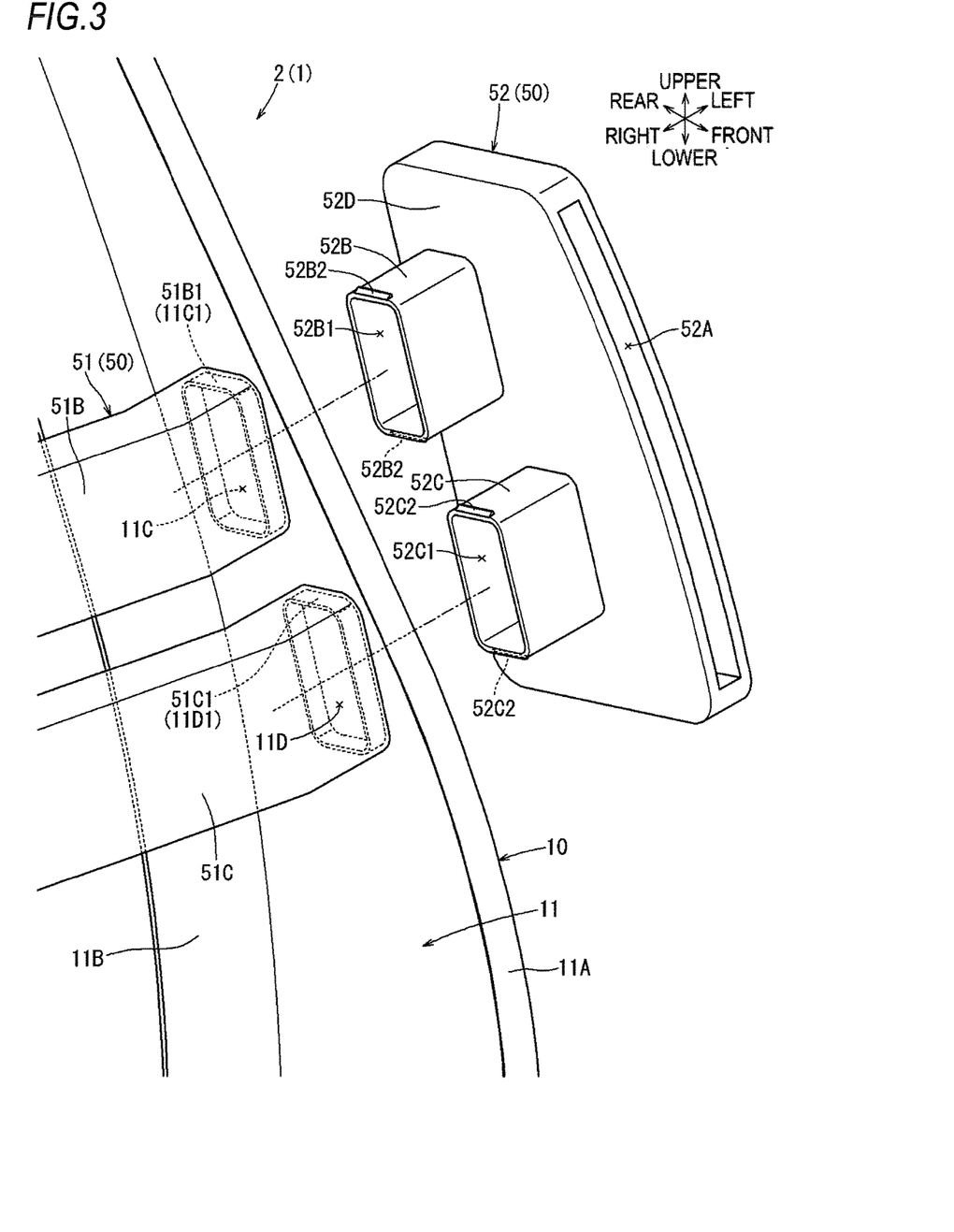
FIG. 3 is a perspective view showing a state where a first divided duct is installed in the seat frame.

Next, the connection ports 51B1 of the first branch flow passages 51B and the connection ports 51C1 of the second branch flow passages 51C, the first branch flow passages 51B and the second branch flow passages 51C being branched vertically and bifurcately, on the left and right of the first divided duct 51 are pressed respectively to fit to the corresponding outer peripheral portions of the flange portions 11C1 of the first through holes 11C and the outer peripheral portions of the flange portions 11D1 of the second through holes 11D of the side frames 11 from the inner sides thereof in the seat width direction, so as to be in flow passage connection therewith. In this way, as shown in FIG. 3, the vertically and bifurcately branched first branch flow passages 51B and the second branch flow passages 51C on separately the left and right of the first divided duct 51 achieve a state of being installed integrally to the side frames 11 at two places separated in the seat height direction and the seat front-rear direction.

Next, the configurations of the second divided ducts 52 will be described. As shown in FIG. 2, each of the second divided ducts 52 includes the air outlet 52A opened longitudinally which is exposed to the outer side of the seat back 2 and through which air sent from the seat back 2 can be blown forward. Each of the flow passages of the second divided ducts 52 communicating with the air outlets 52A has a shape branched vertically and bifurcately into the first branch flow passage 52B and the second branch flow passage 52C.

Connection ports 52B1, 52C1 forming openings on upstream sides of the first branch flow passages 52B and the second branch flow passages 52C of the second divided ducts 52 are fitted into corresponding inner peripheral portions of the first through holes 11C and inner peripheral portions of the second through holes 11D from the outer sides thereof in the seat width direction, the first through holes 11C and the second through holes 11D being formed in the side frames 11. In this way, each of the first branch flow passages 52B and the second branch flow passages 52C of the second divided ducts 52 has a shape of an outer peripheral portion capable of being pressed to fit into the first through holes 11C and the second through holes 11D substantially without space therebetween.

The second divided ducts 52 with the above configurations are inserted into the seat back 2 from both the left and right outer sides thereof as to be described below, and the first branch flow passages 52B and the second branch flow passages 52C of the second divided ducts 52 are installed in a state of being in flow passage connection respectively with the first branch passages 51B and the second branch passages 51C on separately the left and the right of the first divided duct 51 installed in the side frames 11. First, as shown in FIG. 4, in a state where the back pad 20 and the back cover 30 are covered on the back frame 10 installed with the first divided duct 51, the corresponding first branch flow passages 52B and the second branch flow passages 52C of the second divided ducts 52 are inserted respectively from the first insertion holes 31A, 21A and the second insertion holes 31B, 21B penetrating the back cover 30 and the back pad 20.

With the above insertion, as shown in FIGS. 5 to 6, the first branch flow passages 52B and the second branch flow passages 52C of the second divided ducts 52 are inserted into the corresponding inner peripheral portions of the first through holes 11C and the inner peripheral portions of the second through holes 11D of the side frames 11, the first through holes 11C and the second through holes 11D being positioned in front of where the first branch flow passages 52B and the second branch flow passages 52C are inserted into the first insertion holes 31A, 21A and the second insertion holes 31B, 21B penetrating the seat cover 30 and the seat pad 20, from respectively the outer sides thereof in the seat width direction, and are pressed to fit in to the first through holes 11C and the second through holes 11D substantially without space therebetween.

Specifically, as shown in FIG. 6, the connection ports 52B1 of the first branch flow passages 52B and the connection ports 52C1 of the second branch flow passages 52C of the second divided ducts 52 are fitted into the corresponding inner peripheral portions of the flange portions 11C1 of the first through holes 11C and the inner peripheral portions of the flange portions 11D1 of the second through holes 11D of the side frames 11 from the outer sides thereof in the seat width direction. In this way, fitting claws 52B2, 52C2 having radially outwardly projecting claw shapes formed on a plurality of places in a peripheral direction on front end sides of the connection ports 52B1 and the connection ports 52C1 are, after getting on the inner peripheral portions of the flange portions 11C1, 11D1, elastically restored at a position in front of where the flange portions 11C1, 11D1 come out to the inner sides in the seat width direction, and are engaged in a state of being caught on front end surfaces of the flange portions 11C1, 11D1 in the inner sides in the seat width direction, so as to be joint integrally in a state where the fitting claws 52B2, 52C2 do not come out to the outer sides in the seat width direction from the flange portions 11C 1, 11D1.

With the above fitting, the first branch flow passages 52B and the second branch flow passages 52C of the second divided ducts 52 are respectively installed in a state of being in flow passage connection with the first branch flow passages 51B and the second branch flow passages 51C on the left and right of the first divided duct 51 via the corresponding flange portions 11C 1 of first through holes 11C and the flange portions 11D1 of the second through holes 11D of the side frames 11. With the above fitting, the second divided ducts 52 also achieve a state of being installed integrally to the side frames 11 at two separate places in the seat height direction and the seat front-rear direction, which is similar to the first divided duct 51. With the above installment, the ducts 50 achieve a state of being disposed in a form extending to penetrate the first through holes 11C and the second through holes 11D opened in the side frames 11.

Since the second divided ducts 52 are installed to the side frames 11, peripheral edge parts 52D projecting into a flange shape and formed on outer peripheral portions of parts of the first branch flow passage 52B and the second branch flow passage 52C of the second divided ducts 52 that protrude outside the seat back 2 are applied separately to the peripheral edge parts 52D of the first insertion holes 31A and the peripheral edge parts 52D of the second insertion holes 31B of the back cover 30 from the outer sides thereof in the seat width direction, so that the second divided ducts 52 are kept in a state of pressing the peripheral edge parts 52D of the second insertion holes 31B of the back cover 30 to the back pad 20 to be sandwiched therebetween via a repulsive force of the back pad 20.

In this way, since the peripheral edge parts 52D of the first insertion holes 31A and the peripheral edge parts 52D of the second insertion holes 31B of the peripheral side surface portions 31 on the left and right of the back cover 30 are pressed elastically between the peripheral edge parts 52D of the second divided ducts 52 and the back pad 20, the first insertion holes 31A and the second insertion holes 31B of the back cover 30 achieve a state of being covered with a good appearance without being seen from outside.

Incidentally, in the embodiment, the same type of air is blown from the air conditioning apparatus 40 to the first branch flow passages 51B and the second branch flow passages 51C on the left and right of the first divided duct 51, and one type of air is blown separately from the air outlets 52A of the second divided duct 52. However, it is possible to blow two types of air different in temperature, humidity, etc. separately from the air outlets 52A by making the entire flow passage of the first divided duct 51 completely branched, for example, by blowing air of different types separately to the first branch flow passages 52B and the second branch flow passages 52C of the second divided ducts 52 linked to the first divided duct 51. Also, it is also possible to blow more types of air by increasing the number of branched flow passages of the first divided duct 51 and the second divided ducts 52.

SUMMARY

In summary, the seat 1 according to the embodiment has the following configuration. That is, the seat 1 is a vehicle seat (seat 1) including a seat frame (side frames 11) extending in a first direction (seat height direction) and an air conditioning duct (ducts 50) extending in a second direction (seat width direction) intersecting the first direction (seat height direction). The duct (ducts 50) intersects the seat frame (side frames 11). The duct (duct 50) is inserted into a through hole (first through holes 11C and second through holes 11D) which is formed in the seat frame (side frames 11) and penetrates the seat frame (side frames 11) in the second direction (seat width direction).

With such a configuration, it is possible to dispose the duct (ducts 50) compactly around the seat frame (side frames 11) without taking a detour by inserting the air conditioning duct (ducts 50) into the through hole (first through holes 11C and second through holes 11D) formed in the seat frame (side frames 11).

The duct (ducts 50) is divided into a first divided duct (first divided duct 51) provided on one side (inner side), in the second direction (seat width direction), of the through hole (first through holes 11C and second through holes 11D) and a second divided duct (second divided ducts 52) provided on another side (outer side), in the second direction (seat width direction), of the through hole (first through holes 11C and second through holes 11D). At least one of the first divided duct (first divided duct 51) and the second divided duct (second divided ducts 52) is inserted into the through hole (first through holes 11C and second through holes 11D). The first divided duct (first divided duct 51) and the second divided duct (second divided ducts 52) are indirectly connected with each other via the through hole (first through holes 11C and second through holes 11D).

With such a configuration, the connecting place of the first divided duct (first divided duct 51) and the second divided duct (second divided ducts 52) can be protected and sealed easily via the rigidity of the seat frame (side frames 11).

The vehicle seat (seat 1) further includes a flange portion (flange portions 11C1 and flange portions 11D1) provided to the seat frame (side frames 11) and protruding in a tubular shape in the second direction (seat width direction). The flange portion (flange portions 11C1 and flange portions 11D1) defines a hole which is a part of the through hole (first through holes 11C and second through holes 11D). The first divided duct (first divided duct 51) is fitted to the flange portion (flange portions 11C 1 and flange portions 11D1). The second divided duct (second divided ducts 52) is inserted into the through hole (first through holes 11C and second through holes 11D). The first divided duct (first divided duct 51) and the second divided duct (second divided ducts 52) are indirectly connected with each other via the through hole (first through holes 11C and second through holes 11D).

With such a configuration, the rigidity of the seat frame (side frames 11) having the through hole (first through holes 11C and second through holes 11D) can be improved appropriately via the forming of the flange portion (flange portions 11C1 and flange portions 11D1), and additionally, the connecting place of the first divided duct (first divided duct 51) and the second divided duct (second divided ducts 52) can be protected more appropriately and sealed easily via the flange portion (flange portions 11C 1 and flange portions 11D1). It is also possible to connect the first divided duct (first divided duct 51) and the second divided duct (second divided ducts 52) individually via the fitting thereof to the flange portion (flange portions 11C1 and flange portions 11D1).

The first divided duct (first divided duct 51) includes a first branched passage (first branch flow passage 51B) and a second branched passage (second branch flow passage 51C). The second divided duct (second divided duct 52) includes a third branched passage (first branch flow passage 52B) and a fourth branched passage (second branch flow passage 52C). The through hole (first through holes 11C and second through holes 11D) includes a first through hole (first through hole 11C) and a second through hole (second through hole 11D) which are formed at different places of the seat frame seat frame (side frames 11) and are separate from each other. The first branched passage (first branch flow passage 51B) and the third branched passage (first branch flow passage 52B) are connected to each other with at least one of the first branched passage (first branch flow passage 51B) and the third branched passage (first branch flow passage 52B) being inserted into the first through hole (first through hole 11C), and the second branched passage (second branch flow passage 51C) and the fourth branched passage (second branch flow passage 52C) are connected to each other with at least one of the second branched passage (second branch flow passage 51C) and the fourth branched passage (second branch flow passage 52C) being inserted in the second through hole (second through hole 11D).

With such a configuration, it is possible to disperse the through hole (first through holes 11C and second through holes 11D) formed in the seat frame (side frames 11) by lowering the size thereof, and to suppress a decrease in the rigidity of the seat frame (side frames 11). Also, since the first divided duct (first divided duct 51) and the second divided duct (second divided ducts 52) are connected with each other at a plurality of separate places, installation strength thereof with each other can be improved.

Other Embodiments

Embodiments of the disclosure have been described with one embodiment, and the disclosure can be carried out in various modes other than the above embodiment. For example, the vehicle seat of the disclosure can be applied not only to a seat other than a right seat of an automobile, but also to a seat for a car other than an automobile such as a train, or another vehicle such as an aircraft and a ship.

The seat frame to which the duct is disposed in an intersecting state may not only be a frame of a seat back, but also a frame of another seat structure such as a seat cushion, an ottoman, and an armrest. The first direction in which the seat frame extends may not only be the seat height direction, but also the seat width direction or the seat front-rear direction. The seat frame may be made not only of a metal, but also of a resin.

The duct may also be made not only of a resin, but also of a metal. The duct may be divided into a plurality of ducts taking the seat frame as a boundary as shown in the above embodiment, and may also be one duct which is inserted into the through hole of the seat frame to penetrate therethrough. In a case where the duct is divided into the first divided duct and the second divided duct, the divided ducts are not necessarily configured to be branched into a plurality of flow passages which are in flow passage connection individually via through holes opened in the seat frame, and may be connected such that the flow passages are inserted into one through hole formed in the seat frame.

Shapes of the duct and the through hole of the seat frame that the duct is inserted into are not limited to the longitudinal shape as shown in the above embodiment, and may be of a perfect circular shape or another irregular shape such as a polygonal shape. Both of the first divided duct and the second divided duct may be fitted to the flange portion provided to the seat frame and protruding into a tubular shape, so as to be in flow passage connection indirectly via the flange portion or directly without via the flange portion.

As a configuration of being in direct flow passage connection with each other by being inserted into each flange portion provided to the seat frame and protruding in the tubular shape from each side thereof, the first divided duct and the second divided duct need not necessarily be fitted to the flange portion, and the connecting place thereof may be simply protected and sealed from an outer peripheral side thereof via the flange portion. The flange portion formed in the seat frame may protrude toward either side of inner and outer sides of the seat.

What is claimed is:
1. A vehicle seat comprising:
a side frame extending in a first direction; and
an air conditioning duct extending in a second direction intersecting the first direction,
wherein the duct intersects the side frame, and wherein the duct is inserted into a through hole which is formed in the side frame and penetrates the side frame in the second direction.

2. The vehicle seat according to claim 1,
wherein the duct is divided into a first divided duct provided on one side, in the second direction, of the through hole and a second divided duct provided on another side, in the second direction, of the through hole, and
wherein at least one of the first divided duct and the second divided duct is inserted into the through hole.

3. The vehicle seat according to claim 2,
wherein the first divided duct and the second divided duct are directly connected with each other in the through hole or indirectly connected with each other via the through hole.

4. The vehicle seat according to claim 2,
wherein both the first divided duct and the second divided duct are inserted into the through hole.

5. The vehicle seat according to claim 2, further comprising: a flange portion provided to the side frame and protruding in a tubular shape in the second direction,
wherein the flange portion defines a hole which is a part of the through hole,
wherein the first divided duct is fitted to the flange portion, and
wherein the second divided duct is inserted into the through hole.

6. The vehicle seat according to claim 5,
wherein the first divided duct and the second divided duct are indirectly connected with each other via the through hole.

7. The vehicle seat according to claim 2,
wherein the first divided duct includes a first branched passage and a second branched passage,
wherein the second divided duct includes a third branched passage and a fourth branched passage,
wherein the through hole includes a first through hole and a second through hole which are formed at different places of the side frame and are separate from each other, and
wherein the first branched passage and the third branched passage are connected to each other with at least one of the first branched passage and the third branched passage being inserted into the first through hole, and the second branched passage and the fourth branched passage are connected to each other with at least one of the second branched passage and the fourth branched passage being inserted in the second through hole.

8. A vehicle seat comprising:
a side frame extending in a first direction; and
an air conditioning duct extending in a second direction intersecting the first direction,
wherein the duct intersects the side frame,
wherein the side frame has a through hole which penetrates the side frame in the second direction,
wherein a flange portion protruding in a tubular shape in the second direction is provided to the side frame,
wherein the flange portion defines a hole which is a part of the through hole, and
wherein the duct is fitted to the flange portion.

* * * * *